(12) United States Patent  
Tachikawa

(10) Patent No.: US 8,643,866 B2
(45) Date of Patent: Feb. 4, 2014

(54) ELECTRIC ENERGY CONSUMPTION CONTROL SYSTEM, ELECTRIC ENERGY CONSUMPTION CONTROL METHOD, AND STORAGE MEDIUM STORING CONTROL PROGRAM THEREFOR

(75) Inventor: Tomohiro Tachikawa, Kawasaki (JP)

(73) Assignee: Canon Kabushiki Kaisha (JP)

( * ) Notice: Subject to any disclaimer, the term of this patent is extended or adjusted under 35 U.S.C. 154(b) by 199 days.

(21) Appl. No.: 13/281,580

(22) Filed: Oct. 26, 2011

(65) Prior Publication Data

US 2012/0105899 A1 May 3, 2012

(30) Foreign Application Priority Data

Oct. 29, 2010 (JP) ................................. 2010-243778

(51) Int. Cl.
 *G06K 15/00* (2006.01)
 *G06F 3/12* (2006.01)
(52) U.S. Cl.
 USPC .......................... 358/1.14; 358/1.15; 358/1.13
(58) Field of Classification Search
 None
 See application file for complete search history.

(56) References Cited

U.S. PATENT DOCUMENTS

| 2002/0140964 A1* | 10/2002 | Goto et al. ................... 358/1.14 |
| 2011/0016336 A1* | 1/2011 | Mori et al. ................... 713/320 |
| 2011/0213996 A1* | 9/2011 | Imine et al. ................... 713/323 |
| 2012/0059606 A1* | 3/2012 | Ikari ................................ 702/61 |
| 2013/0107310 A1* | 5/2013 | Kodama ...................... 358/1.14 |

FOREIGN PATENT DOCUMENTS

JP 2008245401 A 10/2008

\* cited by examiner

*Primary Examiner* — Dov Popovici
(74) *Attorney, Agent, or Firm* — Rossi, Kimms & McDowell LLP

(57) ABSTRACT

An electric energy consumption control system that is capable of maximizing convenience to users while controlling the system so that the electric energy consumption of the entire system in a period falls within a target electric energy. An electrical apparatus transmits electric energy consumption of a job with a user name to a control apparatus through the network. A restrictive period setting unit of the control apparatus starts a restrictive period when the electric energy consumption of the entire system is beyond a restriction starting value, and finishes it when the electric energy consumption of the entire system is below a restriction release value. A job restriction unit restricts the job of the user concerned when the accumulated electric energy consumption of the user is beyond the reference value in the restrictive period.

9 Claims, 16 Drawing Sheets

FIG.7

| COMPARISON TIMING | RESTRICTION RELEASE VALUE | RESTRICTION STARTING VALUE | GLOBAL RESULT VALUE [kWh] |
|---|---|---|---|
| FIRST DAY | 5,000,000 | 15,000,000 | 14,000,000 |
| SECOND DAY | 15,000,000 | 25,000,000 | 25,000,000 |
| THIRD DAY | 25,000,000 | 35,000,000 | 33,000,000 |
| FOURTH DAY | 35,000,000 | 45,000,000 | 41,000,000 |
| FIFTH DAY | 45,000,000 | 55,000,000 | 49,000,000 |
| SIXTH DAY | 55,000,000 | 65,000,000 | 57,000,000 |
| SEVENTH DAY | 65,000,000 | 75,000,000 | 66,000,000 |
| EIGHTH DAY | 75,000,000 | 85,000,000 | 75,000,000 |
| .. | .. | .. | .. |

*FIG.14*

| 1401 | 1402 | 1403 |
|---|---|---|
| GLOBAL RESULT TABLE | | |
| | REFERENCE RESULT VALUE | GLOBAL RESULT VALUE [kWh] |
| FIRST DAY | 10,000,000 | 14,000,000 |
| SECOND DAY | 20,000,000 | 28,000,000 |
| THIRD DAY | 30,000,000 | 34,000,000 |
| FOURTH DAY | 40,000,000 | 40,000,000 |
| FIFTH DAY | 50,000,000 | 46,000,000 |
| SIXTH DAY | 60,000,000 | 52,000,000 |
| SEVENTH DAY | 70,000,000 | 66,000,000 |
| EIGHTH DAY | 80,000,000 | 80,000,000 |
| ⋮ | ⋮ | ⋮ |

ALLOWABLE ESTRANGEMENT RATE = 20%
1405
1404

FIG.16

INDIVIDUAL RESULT TABLE 1600

| USER NAME | WEIGHT | ELECTRIC ENERGY CONSUMPTION RESULT VALUE [kWh] | ADJUSTED RESULT VALUE [kWh] | |
|---|---|---|---|---|
| USER L | 0.7 | 256,064 | 179,244 | ⎫ RESTRICTED USER |
| USER K | 1.0 | 128,256 | 128,256 | |
| USER F | 0.5 | 128,000 | 64,000 | |
| USER A | 0.1 | 512,256 | 51,225 | ⎭ |
| USER B | 1.0 | 987 | 967 | ⎫ NON-RESTRICTED USER |
| USER D | 1.0 | 768 | 768 | |
| : | : | : | : | ⎭ |
| USER N | 0 | 123,456,789 | 80,000,000 | |
| SUM TOTAL | — | 1,400,000,000 | — | |

1601  1602  1603  1604

| REFERENCE VALUE OF INDIVIDUAL RESULT TABLE [kWh] |
|---|
| 1,000 — 1605 |

ELECTRIC ENERGY CONSUMPTION CONTROL SYSTEM, ELECTRIC ENERGY CONSUMPTION CONTROL METHOD, AND STORAGE MEDIUM STORING CONTROL PROGRAM THEREFOR

BACKGROUND OF THE INVENTION

1. Field of the Invention

The present invention relates to an electric energy consumption control system and an electric energy consumption control method that control electric energy consumption of an image forming apparatus. Particularly, the present invention relates to the electric energy consumption control system, the electric energy consumption control method, and a storage medium storing control program therefor, which are capable of controlling electric energy consumption of an apparatus for each of users based on a target electric energy consumption in a fixed period set by each of the users to operate the apparatus by expected electric energy consumption while balancing needs of the users.

2. Description of the Related Art

In general, there is a known electric energy consumption control technique that establishes a target electric energy consumption as a reference value with respect to electric energy consumption of an image forming apparatus and that shifts an operation mode to a power saving mode with which the image forming apparatus is provided based on the reference value.

Japanese Laid-Open Patent Publication (Kokai) No. 2008-245401 (JP 2008-245401A) discloses a power control system that uses such a electric energy consumption control technique and that includes image forming apparatuses used by users. The power control system establishes a reference value for electric energy consumption in a predetermined period for each of the users and has a function for restricting the uses by a user whose electric energy consumption exceeded his or her reference value.

The conventional power control system merely restricts the use of the user whose electric energy consumption exceeds the reference value until expiring the period, but cannot control the total electric energy consumed by all the users.

Moreover, in the conventional power control system, the value that totaled the reference values of all the users is a target value of the entire control system, and the total amount of the resultant electric energy of all the users is an entire-system result value. Accordingly, in the conventional power control system, when there are many users whose resultant electric energy does not reach the reference value, the entire-system result value may be adequately lower than the target value of the entire control system. However, even when there is such a margin, a user whose resultant electric energy exceeded the reference value is restricted to use.

SUMMARY OF THE INVENTION

The present invention provides a electric energy consumption control system, a electric energy consumption control method, and a storage medium storing a control program therefor, which are capable of maximizing convenience to users while controlling the system so that the electric energy consumption of the entire system in a period falls within a target electric energy.

Accordingly, a first aspect of the present invention provides a electric energy consumption control system comprising an electrical apparatus that is connected to a network comprising a electric energy consumption specifying unit configured to specify electric energy consumption for every job, a user identifying unit configured to identify a name of a user who performs a job, and a transmission unit configured to transmit data in which the electric energy consumption of the job specified by the electric energy consumption specifying unit is associated with the user name through the network; a electric energy consumption control apparatus that is connected to the network comprising a restriction value control unit configured to set and hold a restriction starting value that starts restriction to electric energy consumption of the entire system and the restriction release value that releases the restriction to the electric energy consumption of the entire system, a first comparison unit configured to compare the electric energy consumption of the entire system with the restriction starting value and the restriction release value at every predetermined comparison timing, a restrictive period setting unit configured to start a restrictive period when the first comparison unit determines that the electric energy consumption of the entire system is beyond the restriction starting value, and to finish the restrictive period when the first comparison unit determines that the electric energy consumption of the entire system is below the restriction release value, a second comparison unit configured to compare accumulated electric energy consumption of the user who designated the job with a predetermined reference value of individual result when receiving job execution permission by the user in the restrictive period, a job restriction unit configured to restrict the job of the user concerned when the second comparison unit determines that the accumulated electric energy consumption of the user is beyond the reference value, and a job permission unit configured to permit the job of the user concerned when the second comparison unit determines that the accumulated electric energy consumption of the user is not beyond the reference value, and to permit job of any users when receiving the job execution permission in a period other than the restrictive period.

Accordingly, a second aspect of the present invention provides a electric energy consumption control method that can be used in a electric energy consumption control system that is constituted by connecting electrical apparatuses with a electric energy consumption control apparatus via a network so that communication is possible, the method comprising a step of specifying electric energy consumption for every job, which is executed by the electrical apparatus, a step of identifying a name of a user who performs a job, which is executed by the electrical apparatus, a step of transmitting data in which the electric energy consumption of the job specified by the electric energy consumption specifying unit is associated with the user name through the network, which is executed by the electrical apparatus, a step of setting and holding a restriction starting value that starts restriction to electric energy consumption of the entire system and the restriction release value that releases the restriction to the electric energy consumption of the entire system, which is executed by the electric energy consumption control apparatus, a step of comparing the electric energy consumption of the entire system with the restriction starting value and the restriction release value at every predetermined comparison timing, which is executed by the electric energy consumption control apparatus, a step of starting a restrictive period when it is determined that the electric energy consumption of the entire system is beyond the restriction starting value, which is executed by the electric energy consumption control apparatus, a step of finishing the restrictive period when it is determined that the electric energy consumption of the entire system is below the restriction release value, which is executed by the electric energy consumption control apparatus, a step of comparing accumulated electric energy consumption of the user who designated the job with a predetermined reference value of individual result when receiving job execution permission by the user in the restrictive period, which is executed by the electric energy consumption control apparatus, a step of restricting the job when it is determined that the accumulated electric energy consumption of the user is beyond the reference value, and a step of permitting the job of the user concerned when it is determined that the accumulated electric energy consumption of the user is not beyond the reference value, and of permitting the job of any users when receiving the job execution permission in a period other than the restrictive period.

Accordingly, a third aspect of the present invention provides a non-transitory computer-readable storage medium storing a control program causing a computer to execute a electric energy consumption control method that can be used in a electric energy consumption control system that is constituted by connecting electrical apparatuses with a electric energy consumption control apparatus via a network so that communication is possible, the method comprising a step of specifying electric energy consumption for every job, which is executed by the electrical apparatus, a step of identifying a name of a user who performs a job, which is executed by the electrical apparatus, a step of transmitting data in which the electric energy consumption of the job specified by the electric energy consumption specifying unit is associated with the user name through the network, which is executed by the electrical apparatus, a step of setting and holding a restriction starting value that starts restriction to electric energy consumption of the entire system and the restriction release value that releases the restriction to the electric energy consumption of the entire system, which is executed by the electric energy consumption control apparatus, a step of comparing the electric energy consumption of the entire system with the restriction starting value and the restriction release value at every predetermined comparison timing, which is executed by the electric energy consumption control apparatus, a step of starting a restrictive period when it is determined that the electric energy consumption of the entire system is beyond the restriction starting value, which is executed by the electric energy consumption control apparatus, a step of finishing the restrictive period when it is determined that the electric energy consumption of the entire system is below the restriction release value, which is executed by the electric energy consumption control apparatus, a step of comparing accumulated electric energy consumption of the user who designated the job with a predetermined reference value of individual result when receiving job execution permission by the user in the restrictive period, which is executed by the electric energy consumption control apparatus, a step of restricting the job when it is determined that the accumulated electric energy consumption of the user is beyond the reference value, and a step of permitting the job of the user concerned when it is determined that the accumulated electric energy consumption of the user is not beyond the reference value, and of permitting the job of any users when receiving the job execution permission in a period other than the restrictive period.

Further features of the present invention will become apparent from the following description of exemplary embodiments with reference to the attached drawings.

BRIEF DESCRIPTION OF THE DRAWINGS

FIG. 7 is a global result table concerning the electric energy consumption control system shown in FIG. 1.

FIG. 14 is a global result table concerning the electric energy consumption control system according to a second embodiment of the present invention.

FIG. 16 is a global result table concerning an electric energy consumption control system according to a third embodiment of the present invention.

DESCRIPTION OF THE EMBODIMENTS

Hereafter, embodiments according to the present invention will be described in detail with reference to the drawings.

Hereafter, a electric energy consumption control system concerning a first embodiment of the present invention and a electric energy consumption control method available therefor will be described with reference to drawings.

Figure 1:
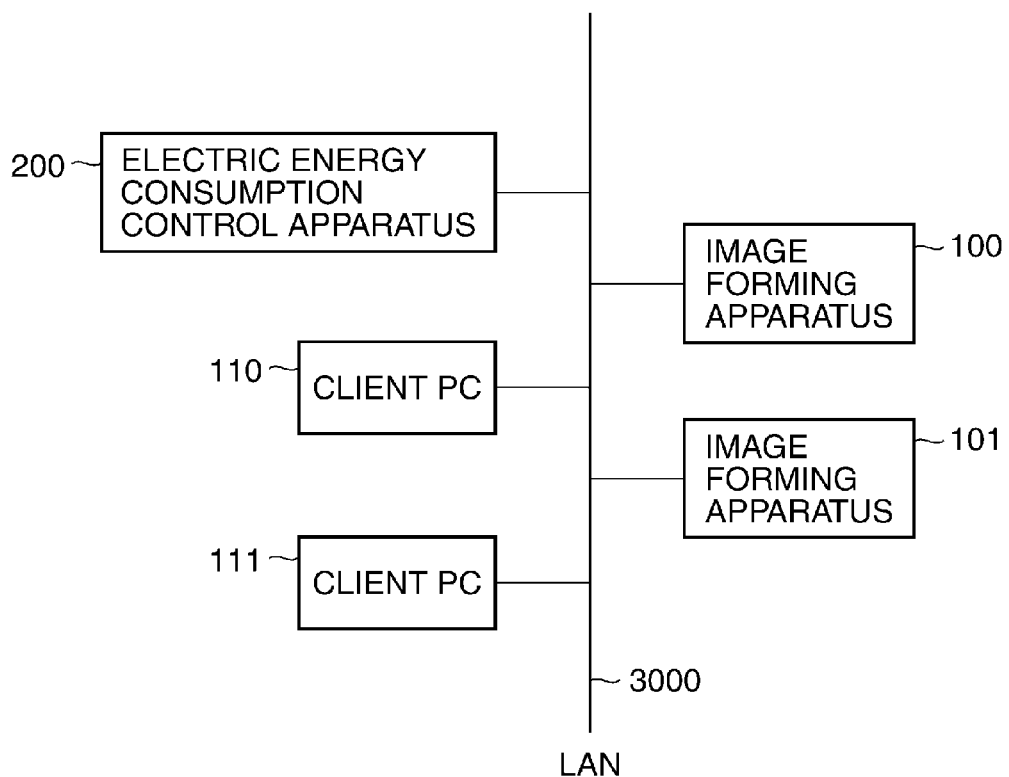
FIG. 1 is a block diagram schematically showing a connecting configuration of client PCs, image forming apparatuses, and a control apparatus in a electric energy consumption control system according to a first embodiment of the present invention.

FIG. 1 shows a configuration of the electric energy consumption control system according to the first embodiment. The electric energy consumption control system shown in FIG. 1 is constituted by mutually connecting image forming apparatuses (electrical devices) 100 and 101 each of which is able to calculate or measure electric energy consumption, client PCs 110 and 111 that transmit print jobs, and a electric energy consumption control apparatus 200 that controls electric energy consumption of the entire system via a LAN 3000.

In the electric energy consumption control system, print jobs from users are transmitted to the image forming apparatuses 100 and 101 from the client PCs 110 and 111. Copy jobs are instructed by users through the image forming apparatuses 100 and 101.

When receiving such print jobs or copy jobs, the image forming apparatuses 100 and 101 transmit job execution requests to the electric energy consumption control apparatus 200. When receiving the job execution requests, the electric energy consumption control apparatus 200 determines whether the executions of the jobs are permitted or not based on the electric energy consumption of the system and the users who instructed the jobs. Then, the electric energy consumption control apparatus 200 notifies job execution permissions to the image forming apparatuses 100 and 101 when the executions of the jobs are permitted. Then, the image forming apparatuses 100 and 101 that obtained the job execution permissions from the electric energy consumption control apparatus 200 execute the print jobs and the copy jobs.

Next, details of the image forming apparatus 100 will be described with reference to FIG. 2.

The image forming apparatus 100 is provided with an operation unit 60 through which a user performs various kinds of operations, a scanner unit 10 that reads image information according to an instruction from the operation unit 60, and a printer unit 20 that prints image data on a sheet. The image forming apparatus 100 is provided with a power supply unit 40 that supplies electric power to various units, and a power measurement unit 30 that measures electric power consumption of the entire image forming apparatus 100. The image forming apparatus 100 is provided with a controller 1200 that is connected with the scanner unit 10, the printer unit 20, and the LAN3000, and that has control over operations of the image forming apparatus 100. The controller 1200 controls input and output of image information, device information, information about the electric energy consumption, etc.

Next, an internal configuration of the controller 1200 will be described with reference to FIG. 2.

The controller 1200 is provided with a raster image processor (RIP) 1250, a scanner image processor 1260, a printer image processor 1270, an image rotator 1230, an image compression/expansion unit 1240, a device I/F 1220, an image bus 1212, a CPU 1201, a RAM 1202, an operation unit I/F 1206, a network unit 1210, a ROM 1203, a hard disk drive (HDD) 1204, an internal communication I/F 1208, a system bus 1207, an image bus I/F 1205, and a power source control unit 1280.

The raster image processor (RIP) 1250 develops a PDL code that is included in a print job received via the LAN 3000 into a bitmap image. The scanner image processor 1260 corrects, processes, and edits image data that is inputted from the scanner unit 10. The printer image processor 1270 corrects the image data that is outputted (printed) by the printer unit 20 and changes the resolution thereof. The image rotator 1230 converts image data to rotate the image.

The image compression/expansion unit 1240 performs a JPEG compression/extension process to multilevel image data, and performs a JBIG, MMR, or MH compression/extension process to binary image data. The device I/F 1220 connects to the scanner unit 10 and the printer unit 20, and converts the image data between a synchronizing system and an asynchronous system. The image bus 1212 connects these units mutually, and transmits image data at high speed.

The CPU 1201 has control over the image forming apparatus 100. The RAM 1202 is a system work memory for an operation of the CPU 1201, and is also an image memory for storing image data temporarily.

The operation unit I/F 1206 is an interface with the operation unit 60. The operation unit I/F 1206 outputs image data displayed on the operation unit 60 to the operation unit 60, and transfers information that a user who uses the image forming apparatus concerned inputs through the operation unit 60 to the CPU 1201.

The network unit 1210 is connected to the LAN 3000 in order to communicate (transmit and receive) with the client PC 110 and other computer terminals (not shown) on the LAN 3000. The ROM 1203 stores a boot program executed by the CPU 1201. The hard disk drive (HDD) 1204 stores system software, image data, software counter values, etc. The internal communication I/F 1208 communicates with CPUs of the scanner unit 10 and the printer unit 20, respectively. The system bath 1207 connects these units mutually. The image bus I/F 1205 is a bus bridge that connects the system bus 1207 and the image bus 1212, and converts a data structure.

The power source control unit 1280 supplies the DC power received via an electric power supply line 1281 from the power supply unit 40 to the predetermined units of the controller 1200 via electric power supply lines 1282 and 1283. The power source control unit 1280 is controlled by a control signal received from the CPU 1201 via a controlling signal line 1284 and a control signal received from the network unit 1210 etc. via a controlling signal line 1285. The power source control unit 1280 can control the power supply unit 40 according to instructions from the CPU 1201.

The power source control unit 1280 turns ON/OFF the electric power supply lines 1282 and 1283 selectively. The electric power supply line 1282 is connected to the CPU 1201, the ROM 1203, the HDD 1204, the image bus I/F 1205, the internal communication I/F 1208, the device I/F 1220, the image rotator 1230, the image compression/expansion unit 1240, the RIP 1250, the scanner image processor 1260, and the printer image processor 1270. On the other hand, the electric power supply line 1283 is connected to the RAM 1202, the operation unit I/F 1206, and the network unit 1210.

Figure 3:
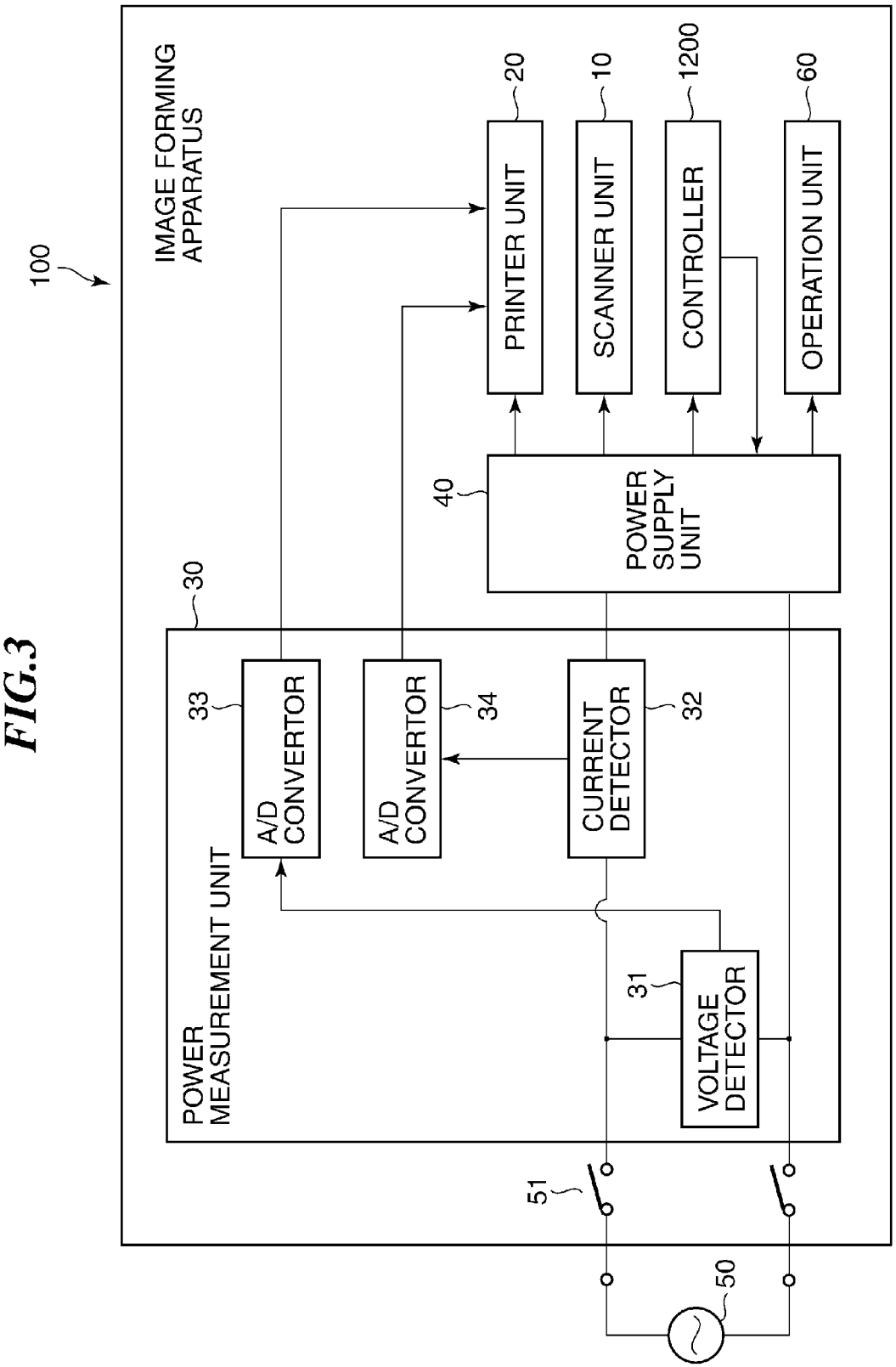
FIG. 3 is a block diagram schematically showing an internal configuration of a power measurement unit of the image forming apparatus shown in FIG. 2.

Next, a configuration for supplying electric power in the image forming apparatus 100 and an internal configuration of the power measurement unit 30 will be described with reference to FIG. 3.

In the image forming apparatus 100, an external commercial power source 50 is connected to the power supply unit 40 via a master electrical switch 51 and the power measurement unit 30.

The power supply unit 40 supplies the power that is generated by the power supplied from the commercial power source 50 to the various units, such as the printer unit 20, the scanner unit 10, the power measurement unit 30, the controller 1200, and the operation unit 60, of the image forming apparatus 100. The power supply unit 40 turns ON/OFF the power supply to the printer unit 20, the scanner unit 10, the operation unit 60, etc. according to a command from the controller 1200.

The power measurement unit 30 of the image forming apparatus 100 is provided with a voltage detector 31 that reads a voltage value, and a current detector 32 that reads an electric current value. The voltage detector 31 rectifies full waves of L (line) and N (neutral) of a general commercial power source, and lowers the rectified value by a transformer etc. An A/D convertor 33 reads the lowered value as the voltage value. The current detector 32 detects magnetic field generated by the electric current passing through the L (line) as a voltage. An A/D convertor 34 reads the voltage as the electric current value. Otherwise, the current detector 32 may read the electric current value by inserting an electric current detection resistance. The current detector 32 may read the electric current value by inserting an element of which temperature changes in response to the passing electric current.

The voltage value and the electric current value, which are detected by the voltage detector 31 and the current detector 32 and are converted by the A/D convertors 33 and 34, are inputted into the printer unit 20. In the printer unit 20, a built-in CPU (not shown) reads the inputted voltage value and electric current value, and stores the product of the two values as electric power consumption (kW) into a memory. The CPU of the printer unit 20 calculates the electric power consumption at fixed intervals during execution of a job, and calculates the electric energy consumption (kWh) that the job consumed by multiplying the electric power consumption and the time.

Thus, the electric energy consumption calculated by the printer unit 20 is transmitted to the CPU 1201 in the controller 1200 because the printer unit 20 communicates with the internal communication I/F 1208 in the controller 1200.

It should be noted that a DSP (digital signal processor), which carries out an operation of digital data at high speed, may be mounted in the power measurement unit 30, and the electric energy consumption may be calculated inside the power measurement unit 30. In this case, the power measurement unit 30 may directly connect with the controller 1200 via the internal communication I/F 1208.

Figure 4:
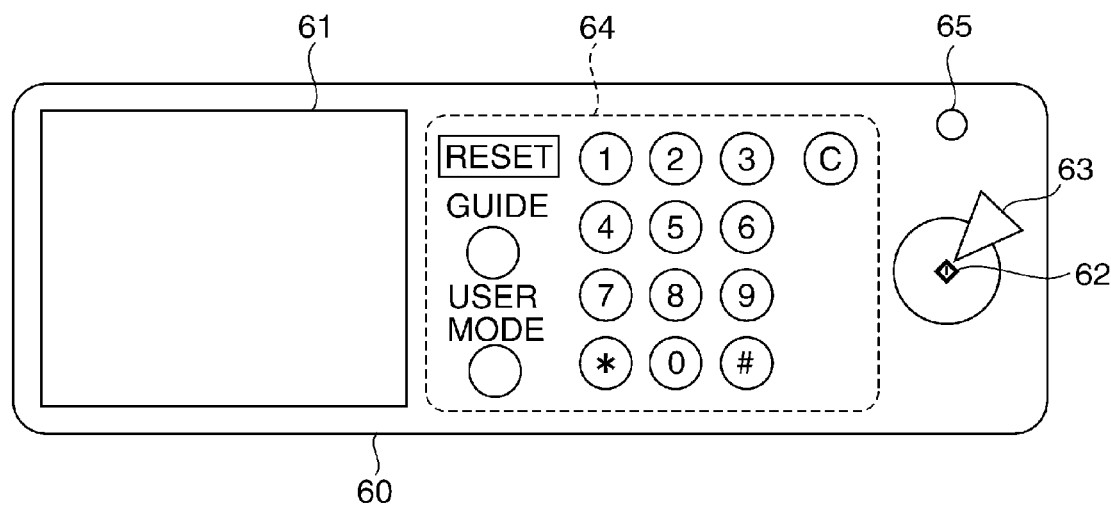
FIG. 4 is a plan view showing an operation unit of the image forming apparatus shown in FIG. 1.

Next, an configuration example of the operation unit 60 of the image forming apparatus 100 will be described with reference to FIG. 4.

The operation unit 60 is provided with a liquid crystal operation panel 61, a start key 62, a stop key 63, a hardkey group 64, and a power saving key 65. The liquid crystal operation panel 61 combines a touch panel and a liquid crystal display that displays an operation screen.

The operation unit 60 sends the information to the controller 1200, when the display key is pressed by the user. Accordingly, the operation unit 60 transmits information required for creating job information (a user name, the number of print/copy sheets, output attribute information, which are inputted using the liquid crystal operation panel 61) to the operation unit I/F 1206.

The hardkey group 64 of the operation unit 60 is provided with a ten-key pad, a clear key, a reset key, a guide key, and a user mode key.

The start key 62, which is arranged adjacent to the hardkey group 64, is used for a start instruction of an operation for reading an original image and for printing, and for a start instruction of another function. The start key 62 is equipped with a green LED and a red LED. Lighting of the green LED in the start key 62 shows that an operation can start. Lighting of the red LED shows that an operation cannot start. The stop key 63, which is arranged adjacent to the start key 62, has a function for stopping an operation in action.

The power saving key 65, which is arranged adjacent to the hardkey group 64, is used to instruct to shift the image forming apparatus into a sleep mode or to return it to a normal mode from the operation unit 60. In the image forming apparatus 100, the mode is shifted to the sleep mode when a user pushes the power saving key 65. On the other hand, the mode is shifted to the normal mode when the user pushes the power saving key 65 in the sleep mode.

Figure 5:
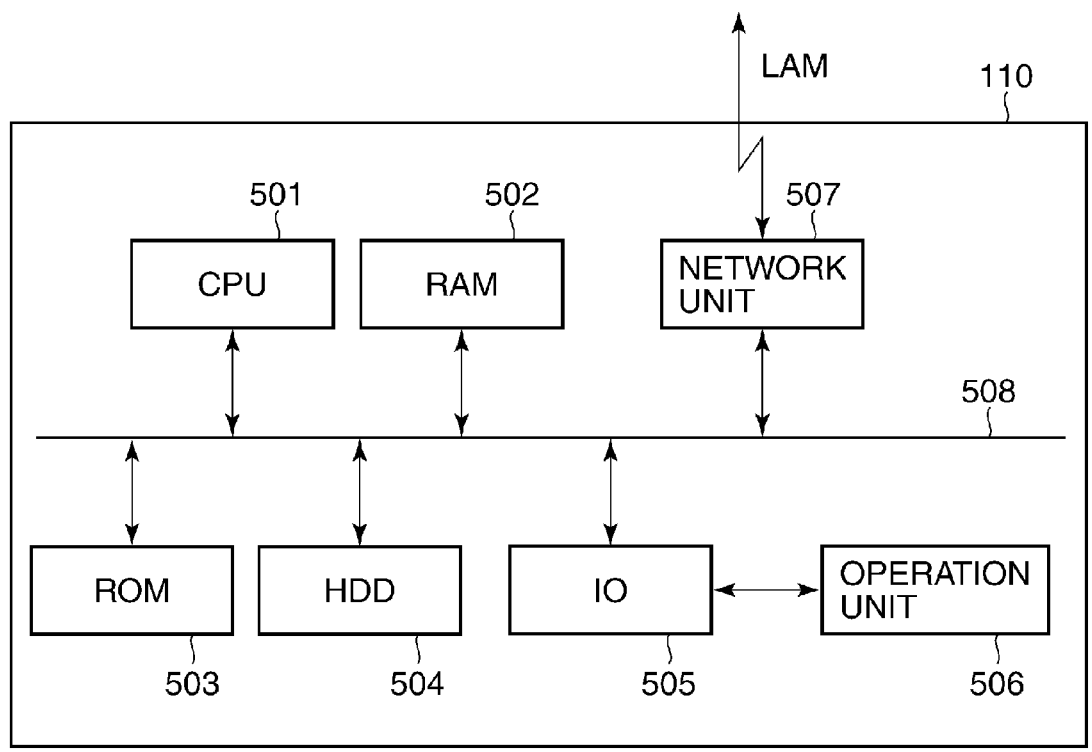
FIG. 5 is a block diagram schematically showing an internal configuration of the client PC shown in FIG. 1.

Next, the hardware configuration of the client PC 110, which is connected to the image forming apparatus 100 via the LAN 3000, will be described with reference to FIG. 5.

The client PC 110 has a CPU 501, a RAM 502, a ROM 503 and an HDD 504, a network unit 507, an IO unit 505, and an operation unit 506, which are mutually connected via a system bus 508.

The CPU 501 provides various functions by reading programs (an OS (Operating System), application software, etc.) from the HDD 504 and by executing them.

The RAM 502 of the client PC 110 acts as a system work memory when the CPU 501 executes the programs. The ROM 503 stores BIOS (Basic Input Output System), a program for starting the OS, and a configuration file. The HDD 504 stores system software and the like. The network unit 507 is connected to the LAN 3000 and communicates (transmits and receives) with external apparatuses such as the image forming apparatus 100. The IO unit 505 is an interface that exchanges information with the operation unit 506 that consists of input/output devices (not shown) such as the liquid crystal display and a mouse.

The liquid crystal display with which the client PC 110 is provided displays predetermined information based on screen information that a program instructs with predetermined resolution and a color number. The liquid crystal display forms a GUI (Graphical User Interface) screen, for example, and displays various windows, data, etc. required for the operation.

Next, a global result value transition view, a global result table, and an individual result table, which are used for controlling electric energy consumption in the image forming apparatus 100 according to the first embodiment, will be described with reference to FIG. 6, FIG. 7, and FIG. 8.

Figure 6:
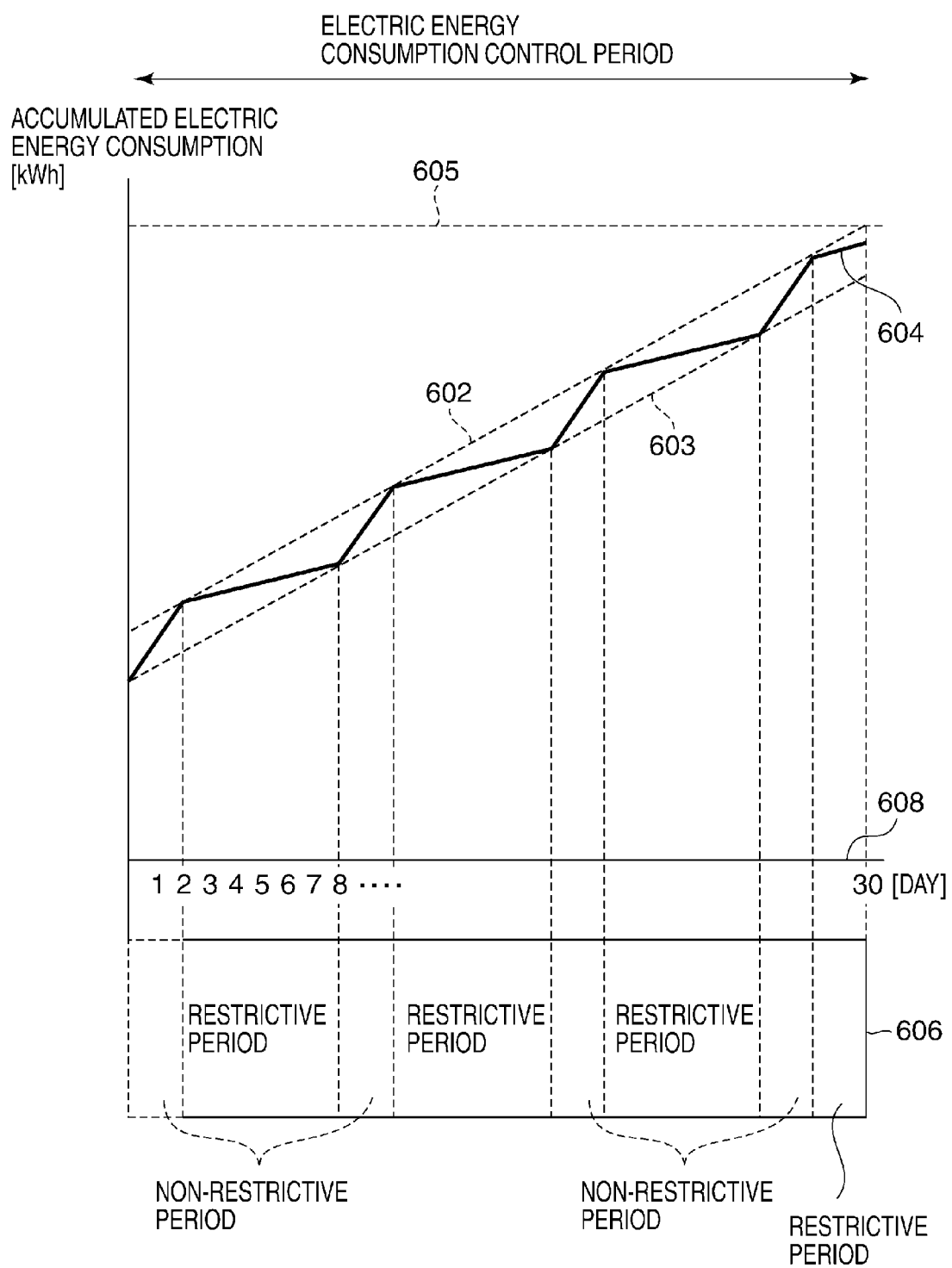
FIG. 6 is a graph showing a change of electric energy consumption of the entire electric energy consumption control system shown in FIG. 1.

The global result value transition view shown in FIG. 6 shows a change of the result value of the electric energy consumption of the entire system. A broken line 605 in FIG. 6 shows a target electric energy consumption of the entire system during the electric energy consumption control period. The global result table shown in FIG. 7 shows a restriction starting value, a restriction release value, and a global result value for every comparison timing. It should be noted that an electric energy consumption control period is 30 days in the first embodiment as shown by a scale 608 in FIG. 6. The timing for monitoring the result value of the entire system is 0:00 everyday. The timings are indicated on the scale 608 in FIG. 6 and a comparison timing field 700 in FIG. 7 as 1 day, 2 days . . . , and 30 days from the start of the electric energy consumption control period.

The restriction release value and the restriction starting value for each day are shown in a restriction release value field 701 and a restriction starting value field 702 of the global result table shown in FIG. 7, respectively. These values are beforehand set by the user through the hardkey group 64 of the operation panel 60. A global result value field 703 shows a global result value that is the electric energy consumption of the entire system accumulated for every comparison timing.

A broken line 602 shown in FIG. 6 connects the restriction starting values at the comparison timings in FIG. 7 by a straight line. Similarly, a broken line 603 connects the restriction release values in FIG. 7 by a straight line. A solid line 604 connects the global result values in FIG. 7 by a straight line. In the example in FIG. 6 and FIG. 7, the global result value reached the restriction starting value on the second day, and reached the restriction release value on the eighth day.

A column 606 shown in FIG. 6 shows distinction between a restrictive period and a non-restrictive period. In the column 606, the non-restrictive period starts at the comparison timing at which the global result value is below the restriction release value, and finishes at the comparison timing at which the global result value exceeds the restriction starting value. In the column 606, the restrictive period starts at the comparison timing at which the global result value exceeds the restriction starting value, and finishes at the comparison timing at which the global result value is less than the restriction release value.

Next, the individual result table used for the electric energy consumption control in the image forming apparatus 100 will be described with reference to FIG. 8.

Figure 8:
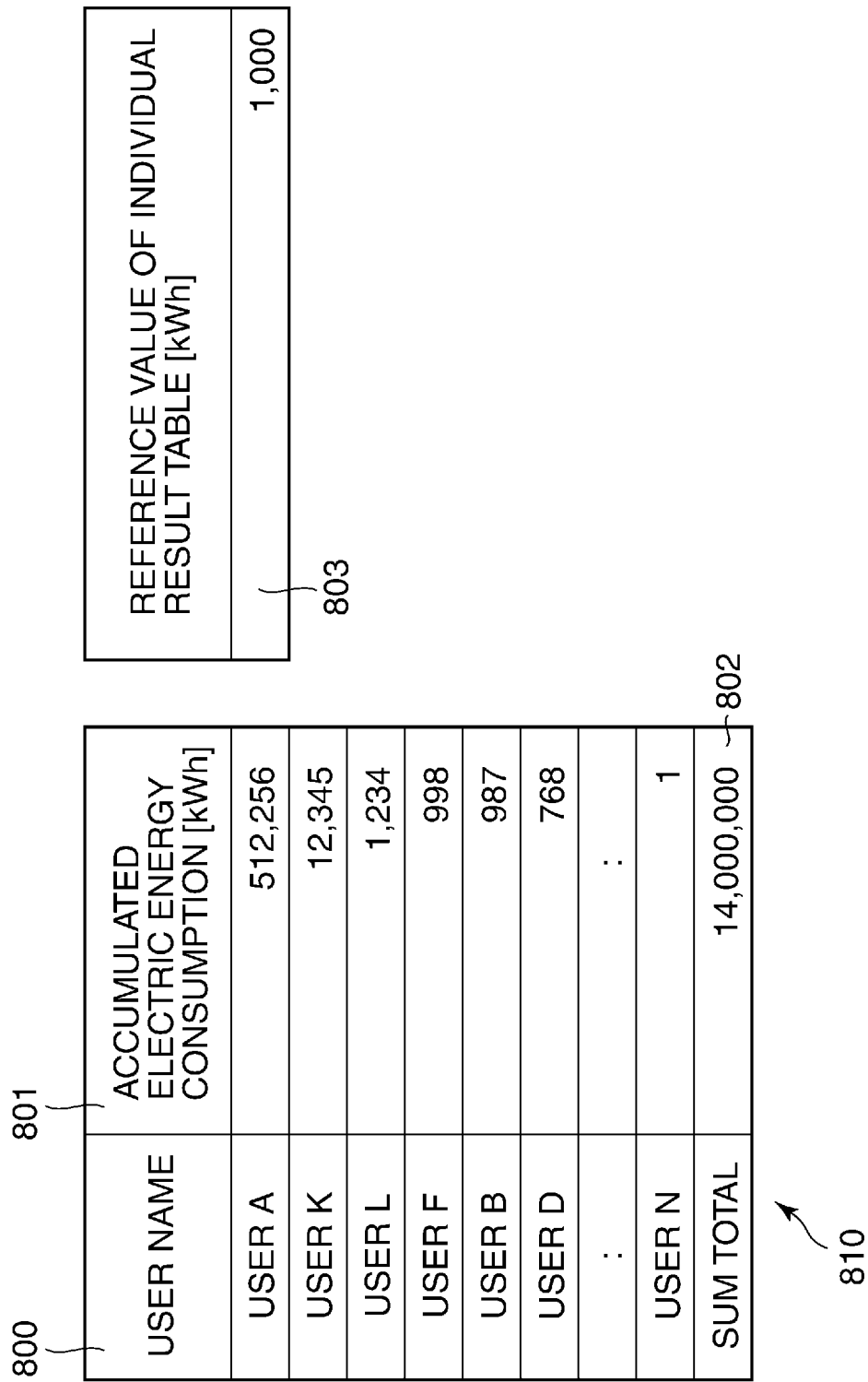
FIG. 8 is an individual result table concerning the electric energy consumption control system shown in FIG. 1.

The individual result table 810 shown in FIG. 8 that stores the electric energy consumption for every user is provided with a user name field 800, an accumulated electric energy consumption field 801 for each user, and a sum total field 802 for the sum of the electric energy consumption of all the users. The individual result table 810 is provided with a reference value field 803 for a reference value of the individual result table that is beforehand set up by a user through the hardkey group 64 of the operation panel 60.

Figure 9:
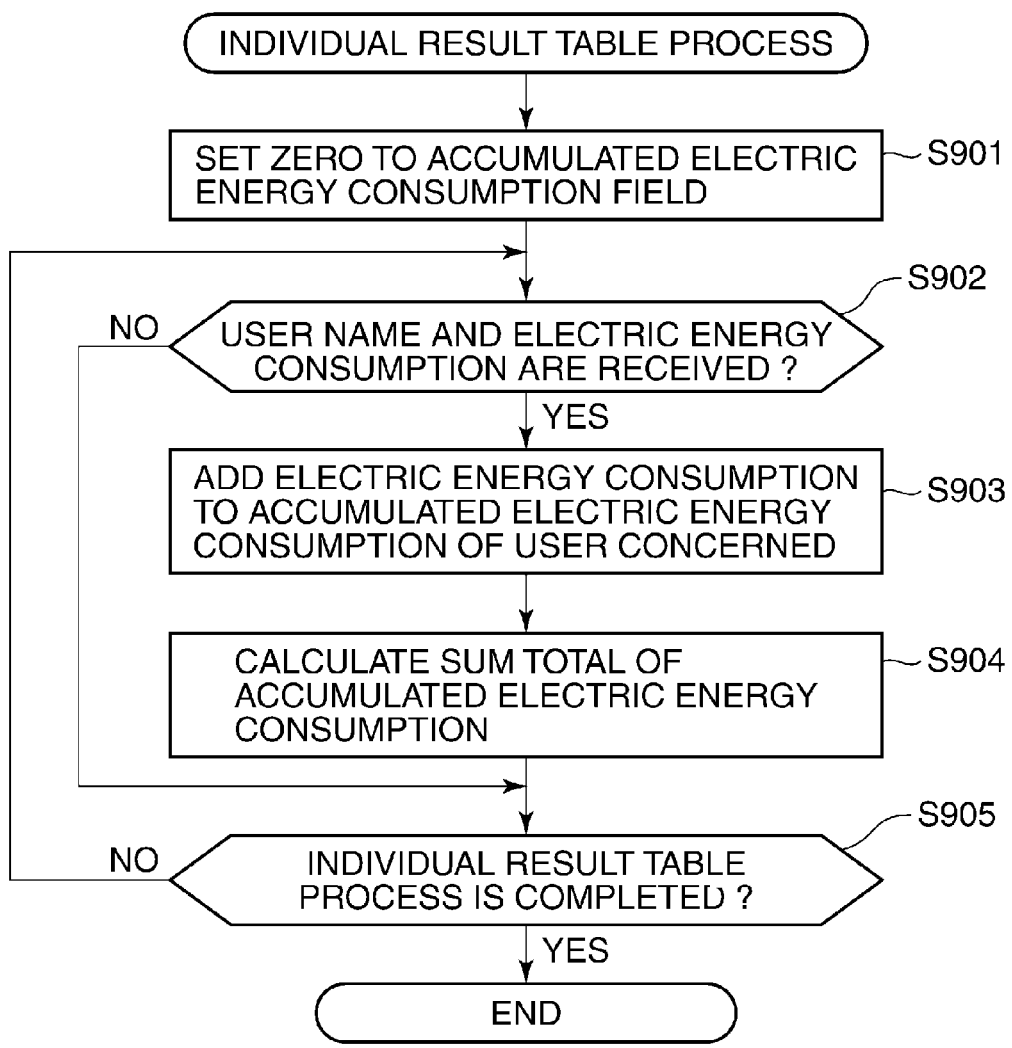
FIG. 9 is a flowchart showing operation procedures of an individual result table process by the control apparatus concerning the electric energy consumption control system shown in FIG. 1.

Next, procedures of an individual result table process executed by the electric energy consumption control apparatus 200 will be described with reference to a flowchart in FIG. 9.

The electric energy consumption control apparatus 200 sets zero to the accumulated electric energy consumption field 801 of all the users shown in FIG. 8 as an initialization process (step S901), when the individual result table process is started.

Next, the electric energy consumption control apparatus 200 determines whether a user name and data of the electric energy consumption of the user have been received (step S902).

When receiving the user name and the data of the electric energy consumption, the electric energy consumption control apparatus 200 adds the electric energy consumption received to the accumulated electric energy consumption in the accumulated electric energy consumption field 801 of the record of which the user name field 800 matches the user name received (step S903). The electric energy consumption control apparatus 200 calculates the sum total of the accumulated electric energy consumption of all the users (step S904), and proceeds with the process to step S905.

When the electric energy consumption control apparatus 200 determines that a user name and data of the electric energy consumption have not been received (NO in the step S902), the process proceeds to step S905.

Next, the electric energy consumption control apparatus 200 determines whether the individual result table process was completed (step S905). When the individual result table process has not been completed (NO in the step S905), the process returns to the step S902, and the above mentioned process is repeated. When it is determined that the individual result table process has been completed, the electric energy consumption control apparatus 200 finishes the individual result table process.

Figure 10:
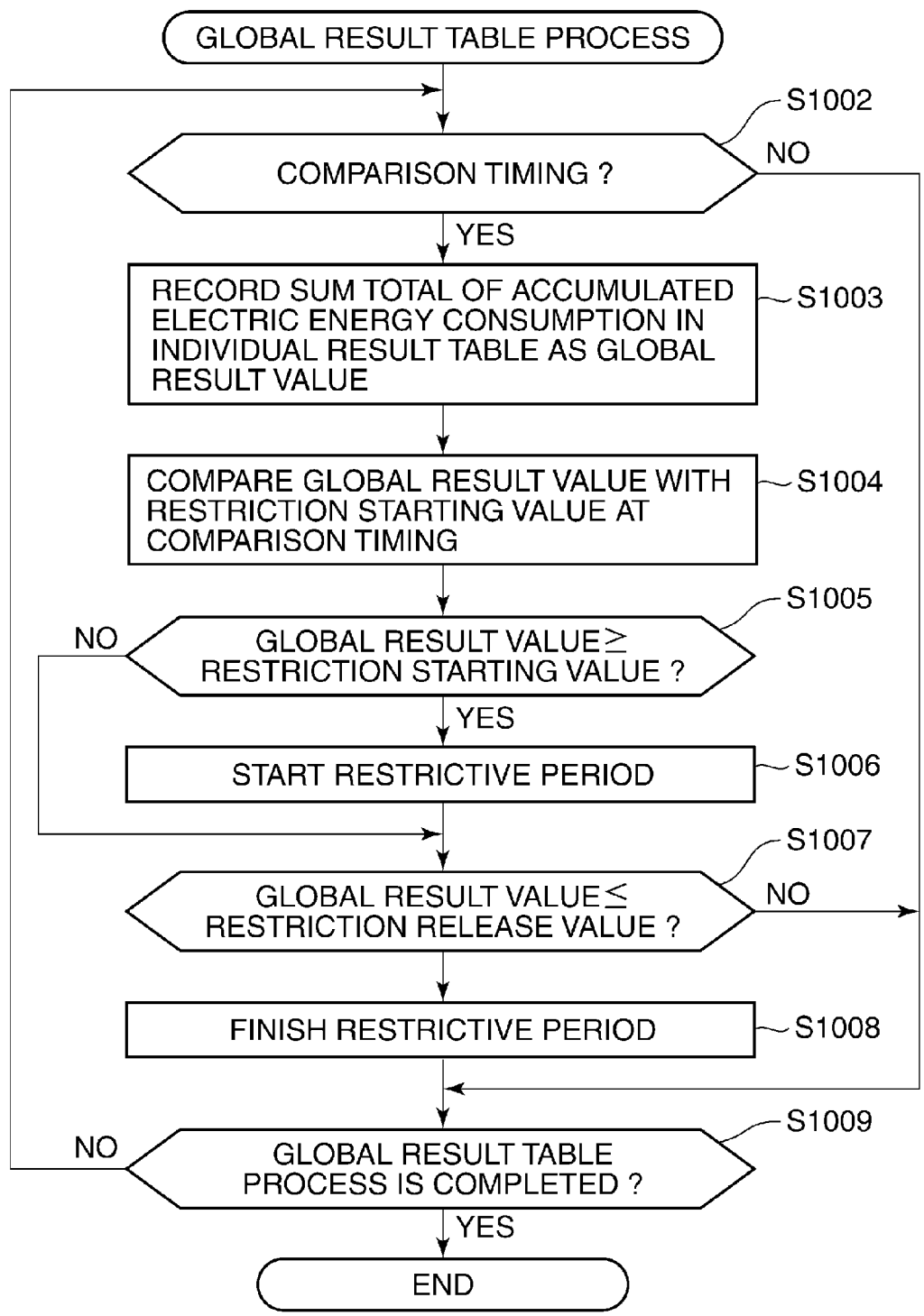
FIG. 10 is a flowchart showing operation procedures of a global result table process by the control apparatus concerning the electric energy consumption control system shown in FIG. 1.

Next, procedures of a global result table process executed by the electric energy consumption control apparatus 200 based on the global result table shown in FIG. 7 will be described with reference to a flowchart in FIG. 10.

The electric energy consumption control apparatus 200 determines whether the comparison timing comes (step S1002) because the global result table process starts at the comparison timing. As mentioned above, since the comparison timing is 0:00, when it determines that the current time is other than 0:00 (NO in the step S1002), the process proceeds to step S1009.

When the electric energy consumption control apparatuses 200 determines that the current time is 0:00 (YES in the step S1002), the process proceeds to step S1003 because the current time is the comparison timing.

Next, the electric energy consumption control apparatus 200 records the sum total of the accumulated electric energy consumption of all the users shown in FIG. 8 as the global result value at the comparison timing into the global result value field 802 (step S1003).

Next, the electric energy consumption control apparatus 200 compares the global result value recorded in the step S1003 with the restriction starting value at the current comparison timing (step S1004). Then, when determining that the global result value is not less than the restriction starting value (YES in the step S1005), the electric energy consumption control apparatus 200 starts the restrictive period (step S1006), and proceeds with the process to step S1007. When determining that the global result value is less than the restriction starting value (NO in the step S1005), the electric energy consumption control apparatus 200 proceeds with the process to the step S1007 as-is.

Next, when determining that the global result value is not more than the restriction release value (YES in the step S1007), the electric energy consumption control apparatus 200 proceeds with the process to step S1008. In the step S1008, when it is in the restrictive period, the electric energy consumption control apparatus finishes the restrictive period and starts the non-restrictive period.

When determining that the global result value is more than the restriction release value (NO in the step S1007), the electric energy consumption control apparatus 200 proceeds with the process to step S1009 as-is.

Next, when determining that the global result table process finishes (YES in the step S1009), the electric energy consumption control apparatus 200 finishes the global result table process. When the electric energy consumption control apparatus 200 determines that the global result table process does not finish (NO in the step S1009), the process returns to the step S1002, and the above mentioned process is repeated.

Specifically, the electric energy consumption control apparatus 200 starts non-restrictive period at the initial timing of the electric energy consumption control period in the global result table process, and the time 0:00 on the first day serves as the first comparison timing. At the first comparison timing, the global result value shown in FIG. 7 is 14,000,000. Since it is determined that this value is less than the restriction starting value at the comparison timing of the first day in the step S1005, the electric energy consumption control apparatus 200 maintains the non-restrictive period.

Next, the time 0:00 on the second day serves as the next comparison timing. Since the global result value at this timing is 25,000,000 and it is determined that the global result value is more than the restriction starting value at the comparison timing of the second day in the step S1005, the electric energy consumption control apparatus 200 starts the restrictive period.

Next, since the global result values are more than the restriction release values, respectively, at the comparison timings on the third day through the seventh day, the electric energy consumption control apparatus 200 maintains the restrictive period.

Next, since the global result value is less than the restriction release value at the comparison timing on the eighth day, the electric energy consumption control apparatus 200 finishes the restrictive period and starts the non-restrictive period in the step S1008.

The control apparatus 200 compares the global result value with the restriction starting value and the restriction release value at every comparison timing, determines the start and the end of the restrictive period, and controls the system by switching the non-restrictive period and the restrictive period as shown in the column 606 in FIG. 6.

Figure 11:
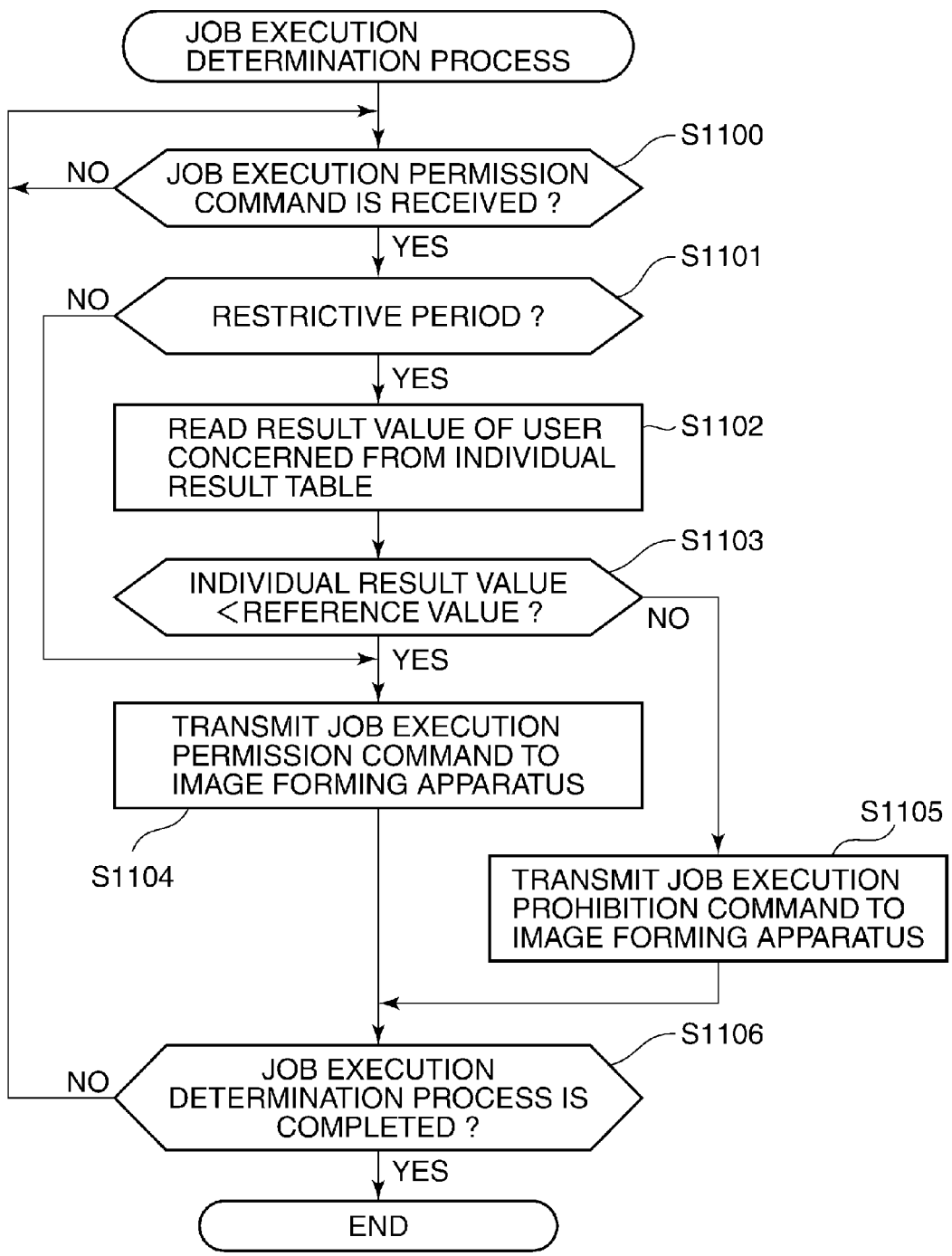
FIG. 11 is a flowchart showing operation procedures of a job execution determination process by the control apparatus concerning the electric energy consumption control system shown in FIG. 1.

Next, a job execution determination process that the control apparatus 200 determines whether execution of a job is permitted or prohibited will be described with reference to a flowchart in FIG. 11.

The control apparatus 200 waits until receiving a job execution permission command with the user name from the image forming apparatus (step S1100). When receiving the job execution permission command (YES in the step S1100), the control apparatus 200 starts the determination process to determine whether the job execution is permitted or prohibited. The electric energy consumption control apparatus 200 determines whether it is in the restrictive period (step S1101). When it is determined that it is in the non-restrictive period (NO in the step S1101), the process proceeds to step S1104. When determining that it is in the restrictive period, (YES in the step S1101), the electric energy consumption control apparatus 200 proceeds with the process to step S1102 and reads the result value of the user of the received job from the individual result table 810 (step S1102).

Next, the electric energy consumption control apparatus 200 determines whether the read individual result value is less than the predetermined reference value (see the reference value field 803 shown in FIG. 8) (step S1103). Then, when determining that the individual result value is beyond the reference value (NO in the step S1103), the electric energy consumption control apparatus 200 determines that the user of the received job is a restricted user, and transmits the job execution prohibition command to the image forming apparatus (step S1105). When determining that the individual result value is less than the reference value (YES in the step S1103), the electric energy consumption control apparatus 200 determines that the user is a non-restricted user, and transmits the job execution permission command to the image forming apparatus (step S1104).

Here, the electric energy consumption control apparatus 200 proceeds with the process to step S1106 after transmitting either of the above mentioned two commands.

Next, the electric energy consumption control apparatus 200 determines whether the job execution determination process finishes (step S1106). When determining that the job execution determination process does not finish (NO in the step S1106, the process returns to the step S1100, and the above mentioned process is repeated. On the other hand, when determining that the job execution determination process finishes (YES in the step S1106), the electric energy consumption control apparatus 200 finishes this process.

Next, procedures of a print job process executed by the image forming apparatus 100 and a notification of the electric energy consumption will be described with reference to a flowchart in FIG. 12.

Figure 2:
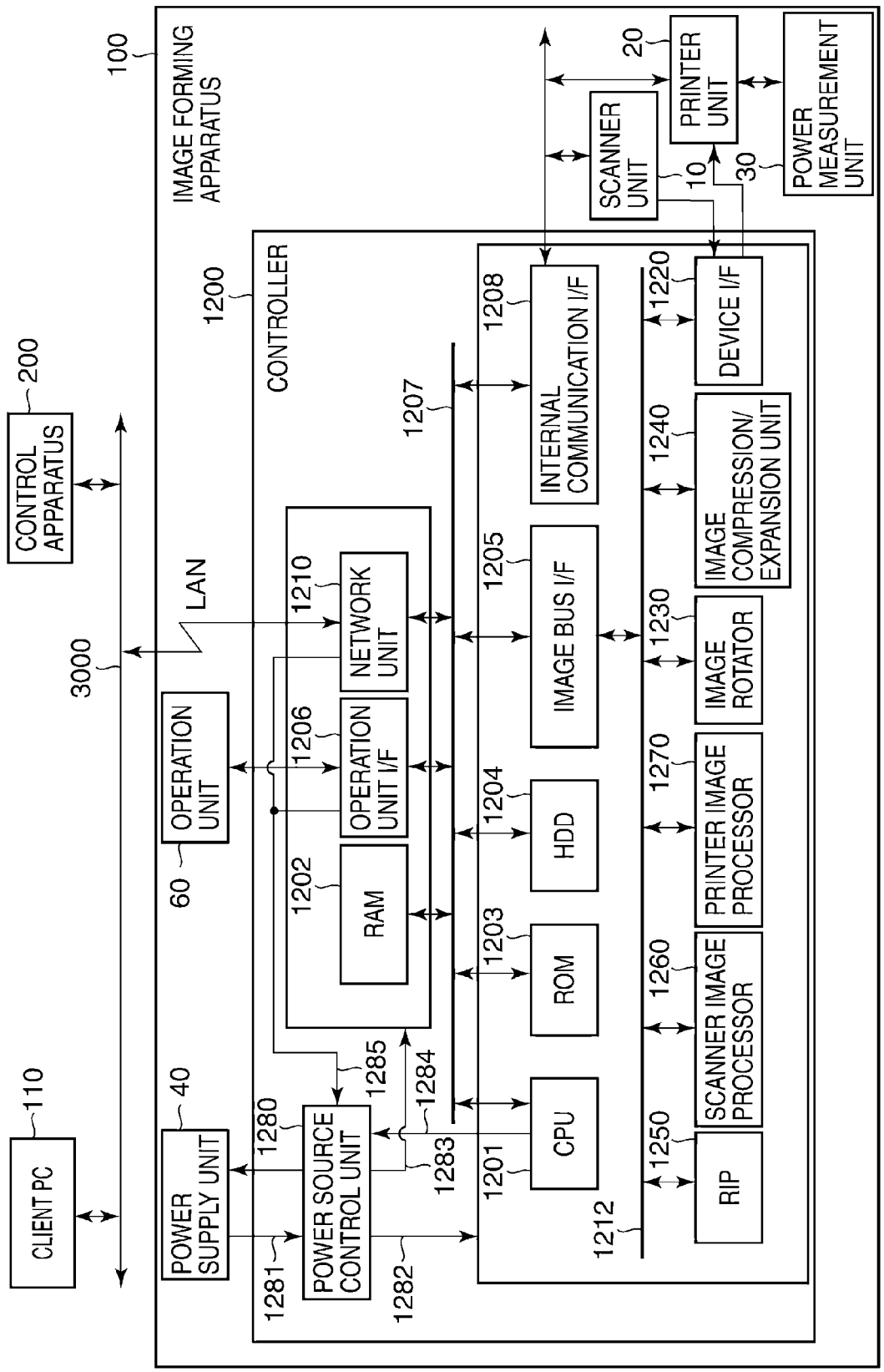
FIG. 2 is a block diagram schematically showing an internal configuration of the image forming apparatus shown in FIG. 1.
Figure 12:
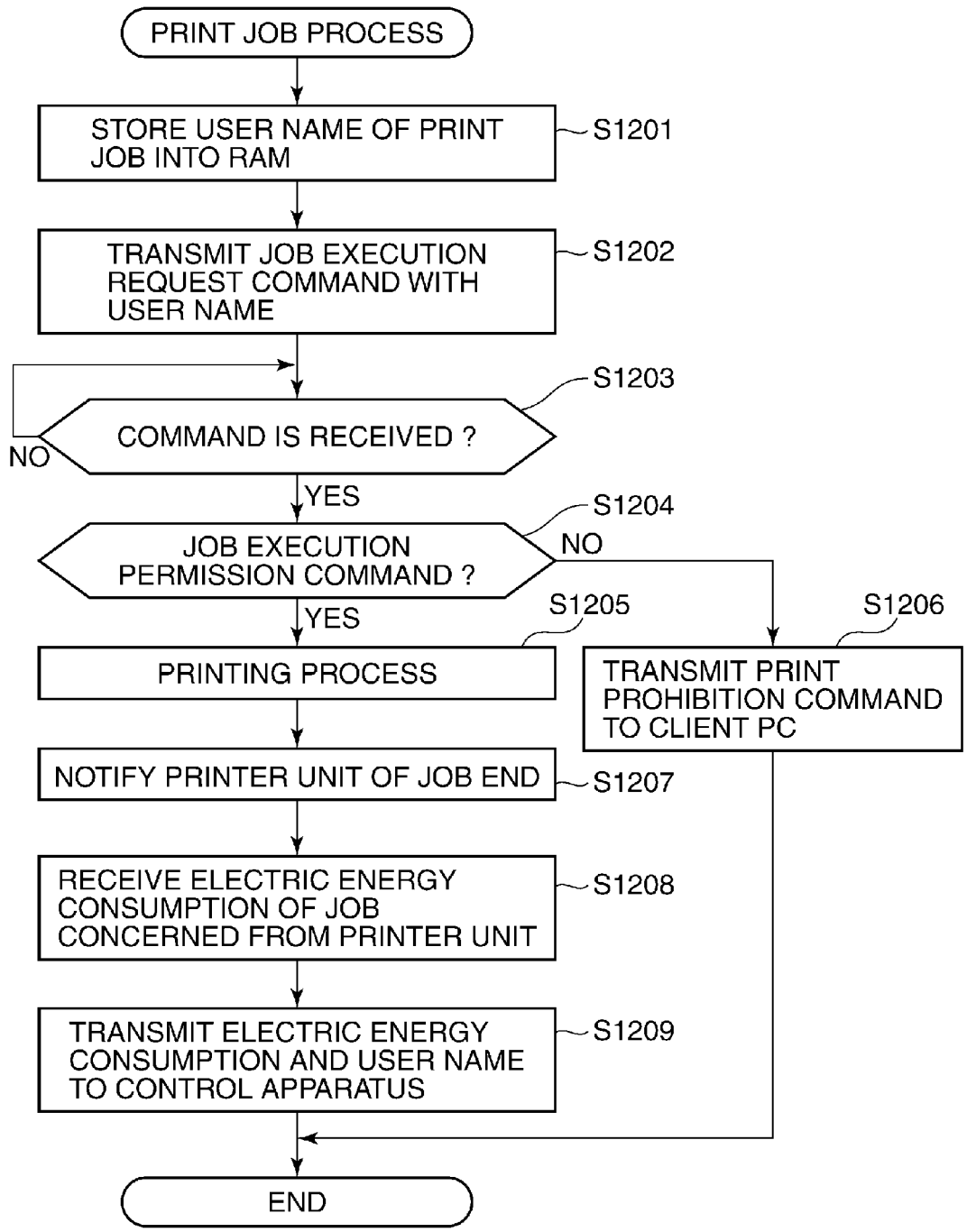
FIG. 12 is a flowchart showing operation procedures of a print job process by the image forming apparatus concerning the electric energy consumption control system shown in FIG. 1.

The CPU 1201 of the image forming apparatus 100 shown in FIG. 2 starts the print job process shown in FIG. 12 when a print job is received through the LAN 3000.

When the print job process starts, the CPU 1201 stores the user name information of the received print job to the RAM 1202 (step S1201).

Next, the CPU 1201 attaches the user name information stored in the step S1201 to a job execution request command and transmits the command to the control apparatus 200 (step S1202), and waits until the command is received from the control apparatus 200 (step S1203).

When receiving the command (YES in the step S1203), the CPU 1201 determines whether the command is the job execution permission command (step S1204). When determining that the job execution prohibition command is received (NO in the step S1204), the CPU 1201 transmits a print prohibition command towards the client PC that transmitted the print job (step S1206), and finishes the print job process. At this time, the CPU 501 that received the print prohibition command from the network unit 507 displays that a print was prohibited on the liquid crystal display of the operation unit 506 via the IO unit 505 in the client PC 110 shown in FIG. 5.

When receiving the job execution permission command (YES in the step S1204), the CPU 1201 of the image forming apparatus 100 executes a printing process (step S1205).

The contents of the printing process (the step S1205) will be described with reference to the block diagram in FIG. 2. When the printing job starts first, the CPU 1201 stores printing data as the image data received via the LAN 3000 into the RAM 1202.

Next, the CPU 1201 supplies the image data to the RIP 1250 via the image bus I/F 1205. Then, the RIP 1250 develops the image data (PDL code) to bitmap data. Next, the image compression/expansion unit 1240 applies a compression process to the bitmap data, and the processed data is stored in the HDD 1204.

Thus, the image data (compressed bitmap data) stored in the HDD 1204 is supplied to the image compression/expansion unit 1240 via the image bus I/F 1205. The image compression/expansion unit 1240 expands the supplied image data (compressed bitmap data).

The printer image processing unit 1270 corrects the expanded image data according to the property of the printer and converts the resolution thereof. The image rotator 1230 applies a rotation process to the image data if needed. Next, the image data to which the various processes have been applied is sent to the printer unit 20 via the device I/F 1220 as printing data. The printer unit 20 prints the image data onto a sheet, and the printing process (S1205) completes.

After the completion of the printing process (the step S1205), the CPU 1201 notifies the printer unit 20 of the job end via the internal communication I/F 1208 (S1207).

When receiving the job end notification, the printer unit 20 replies the electric energy consumption of the job concerned. The CPU 1201 receives the electric energy consumption of the job concerned from the printer unit 20 via the internal communication I/F 1208 (S1208).

When receiving the electric energy consumption of the job, the CPU 1201 adds the electric energy consumption of the job to the user name information of the job that has been stored into the RAM 1202, and transmits the electric energy consumption and the user name information to the control apparatus 200 via the LAN 3000 (step S1209). Then, the CPU 1201 finishes the printing process.

Figure 13:
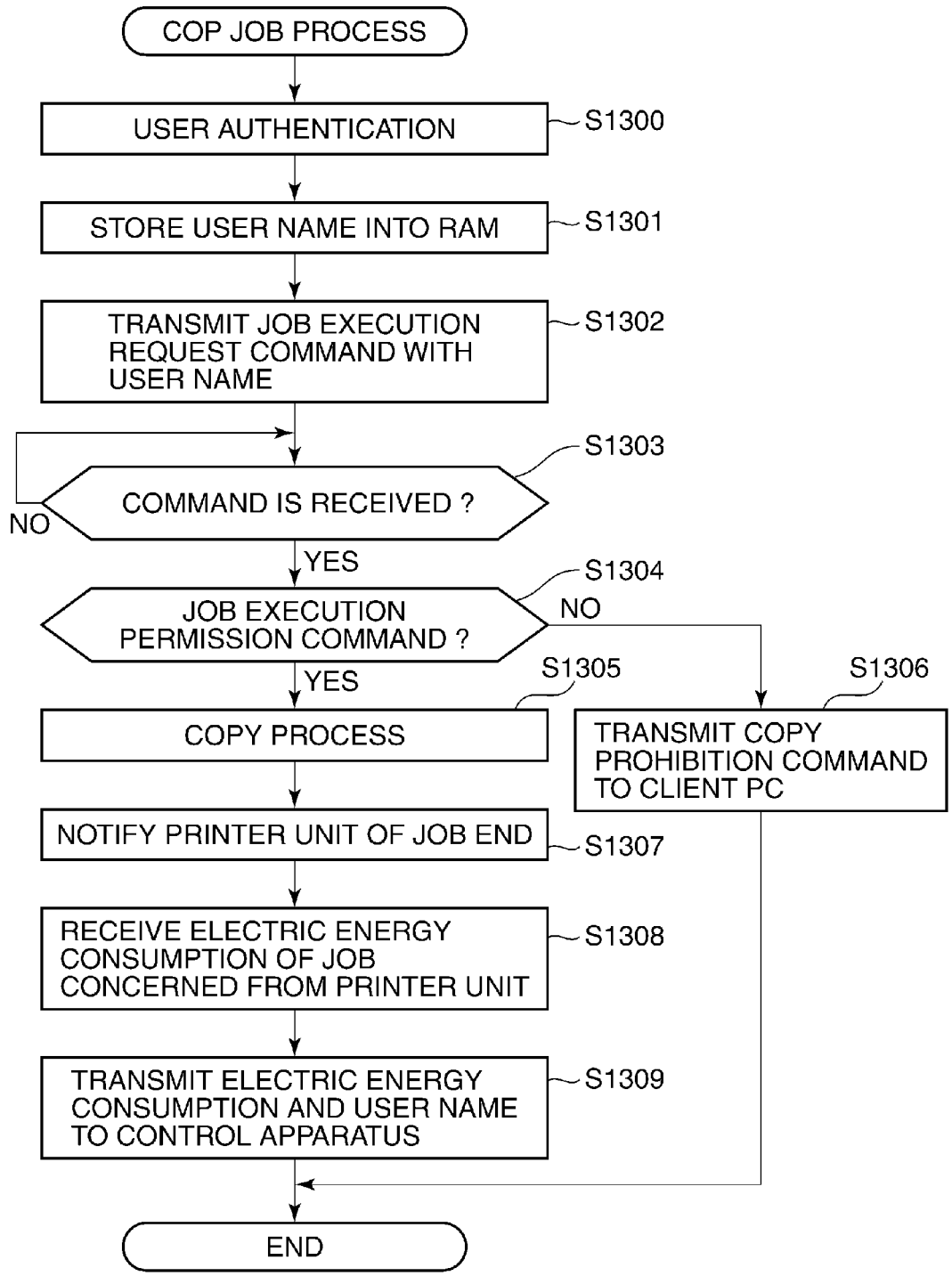
FIG. 13 is a flowchart showing operation procedures of a copy job process by the image forming apparatus concerning the electric energy consumption control system shown in FIG. 1.

Next, procedures of a copy job process executed by the image forming apparatus 100 and a notification of the electric energy consumption will be described with reference to a flowchart in FIG. 13.

When execution of the copy job is instructed from the operation unit 60, the CPU 1201 of the image forming apparatus 100 shown in FIG. 2 performs user authentication by making a user input his or her name (step S1300).

Next, the CPU 1201 stores the user name information into the RAM 1202 (step S1301). Next, the CPU 1201 attaches the user name information stored to a job execution request command and transmits the command to the control apparatus 200 (step S1302), and waits until the command is received from the control apparatus 200 (step S1303).

When receiving the command (YES in the step S1303), the CPU 1201 determines whether the command is the job execution permission command (step S1304). When determining that the job execution prohibition command is received (NO in the step S1304), the CPU 1201 transmits a copy prohibition command towards the client PC that transmitted the copy job (step S1306), and finishes the copy job process. At this time, the CPU 501 that received the copy prohibition command from the network unit 507 displays that a copy was prohibited on the liquid crystal display of the operation unit 506 via the IO unit 505 in the client PC 110 shown in FIG. 5.

When receiving the job execution permission command (YES in the step S1304), the CPU 1201 of the image forming apparatus 100 executes a copy process (step S1305).

The contents of the copy process (the step S1305) will be described with reference to the block diagram in FIG. 2. When the copy process starts first, the CPU 1201 captures image data from the scanner unit 10 via the device I/F. The scanner image processing unit 1260 corrects the captured image data according to the property of the scanner and applies an image process to the image data. The image rotator 1230 applies the rotation process to the image data if needed.

Next, the image compression/expansion unit 1240 applies the compression process to the image data to which the various processes have been applied. Then, the image data is stored in the HDD 1204 via the image bus I/F 1205.

Next, the CPU 1201 supplies the image data (compressed bitmap data) stored in the HDD 1204 to the image compression/expansion unit 1240 via the image bus I/F 1205. The image compression/expansion unit 1240 expands the supplied image data (compressed bitmap data).

The printer image processing unit 1270 corrects the expanded image data according to the property of the printer and converts the resolution thereof. The image rotator 1230 applies the rotation process to the image data if needed. Next, the image data to which the various processes have been applied is sent to the printer unit 20 via the device I/F 1220 as printing data. The printer unit 20 prints the image data onto a sheet, and the copy process (S1305) completes.

After the completion of the copy process (the step S1305), the CPU 1201 notifies the printer unit 20 of the job end via the internal communication I/F 1208 (step S1307).

When receiving the job end notification, the printer unit 20 replies the electric energy consumption of the job concerned. The CPU 1201 receives the electric energy consumption of the job concerned from the printer unit 20 via the internal communication I/F 1208 (step S1308).

When receiving the electric energy consumption of the job, the CPU 1201 adds the electric energy consumption of the job to the user name information of the job that has been stored into the RAM 1202, and transmits the electric energy consumption and the user name information to the control apparatus 200 via the LAN 3000 (step S1309). Then, the CPU 1201 finishes the copy process.

According to the first embodiment, the global result table process, the individual result table process, the job execution determination process, and the print job process, which is executed by receiving the print job, or the copy job process, which is executed by the copy job instruction, are simultaneously executed by the respective apparatuses.

Accordingly, the electric energy consumption result value of the entire system is settled between the straight line 602 that connects the restriction starting values at the comparison timings and the straight line 603 that connects the restriction release values at the comparison timings as shown in FIG. 6. That is, the first embodiment is able to control so that the electric energy consumption of the entire system does not increase beyond the predetermined target electric energy. Thus, the first embodiment is capable of improving convenience to users by controlling start/release of the restriction of the job of the user who consumed large electric energy according to the electric energy consumption of the entire system while controlling the system so that the electric energy consumption result value in the period falls within the predetermined target electric energy.

In short, the electric energy consumption control system according to the first embodiment is constituted by connecting the image forming apparatus 100, which is one of electrical apparatuses, with the electric energy consumption control apparatus 200 via the network so that communication is possible.

The image forming apparatus 100 of the electric energy consumption control system is provided with the electric energy consumption specifying unit (the power measurement unit 30) that specifies the electric energy consumption for every job, and the user identifying unit that identifies the name of user who performs a job. The image forming apparatus 100 is provided with the function that transmits the data in which the electric energy consumption of the job specified by the power measurement unit 30 is associated with the user name, via the network.

The electric energy consumption control apparatus 200 that constitutes the electric energy consumption control system has the function that sets and holds the restriction starting value that starts the restriction to the electric energy consumption of the entire system and the restriction release value that releases the restriction to the electric energy consumption of the entire system.

The electric energy consumption control apparatus 200 is provided with the function that sets the comparison timings within the period during which the electric energy consumption of the entire system is controlled, and the function that compares the electric energy consumption of the entire system with the restriction starting value at each of the comparison timings.

Then, the controller of the electric energy consumption control apparatus 200 starts the restrictive period, when it is determined that the electric energy consumption of the entire system is more than the restriction starting value.

The electric energy consumption control apparatus 200 compares the accumulated electric energy consumption of the user who designated the job with the predetermined reference value of the individual result when receiving the job execution permission by the user through the network in the restrictive period. Then, the electric energy consumption control apparatus 200 restricts the job when it is determined that the accumulated electric energy consumption of the user is more than the reference value, or permits the job when it is determined that the accumulated electric energy consumption of the user is not more than the reference value.

The electric energy consumption control apparatus 200 compares the electric energy consumption of the entire system with the restriction release value at each of the comparison timings. When the electric energy consumption of the entire system is less than the restriction release value, the control apparatus 200 finishes the restrictive period and permits jobs of any users.

Thus, the electric energy consumption control apparatus 200 is capable of improving convenience to users by controlling release of the restriction of the job of the user who consumed large electric energy when the electric energy consumption of the entire system is less than the restriction release value while controlling the system so that the electric energy consumption of the entire system in the period falls within the predetermined target electric energy.

Hereafter, an electric energy consumption control system according to a second embodiment of the present invention will be described with reference to the attached drawings.

Since a configuration and a processing method in the second embodiment are almost the same as that in the first embodiment mentioned above, different points will be mainly described.

In the second embodiment, the global result tables 710 described in the first embodiment mentioned above is replaced by a global result table 1405 shown in FIG. 14.

The second embodiment sets reference result values for the respective comparison timings as listed in a reference result value field 1402 in the global result table 1405 instead of the restriction release values and the restriction starting values that are set in the first embodiment. The reference result values shown in FIG. 14 are calculated by the following calculation method based on the electric energy consumption control period and the target electric energy, and are set in the reference result value fields at the respective comparison timings.

$$RVN = (TEE/PP) \times N$$

Where

RVN: the reference result value at the comparison timing on N-th day,

TEE: the target electric energy, and

PP: the electric energy consumption control period.

In the second embodiment, when the electric energy consumption control period is 30 days and the target electric energy is 300,000,000 (kWh), the reference result value at the comparison timing on the first day is (300,000,000/30)× 1=10,000,000 (kWh). Similarly, the reference result value on the second day is 20,000,000 (kWh), and that on the third day is 30,000,000 (kWh).

In the second embodiment, an allowable estrangement rate 1404 from the reference result value in each comparison timing is beforehand set as 20% through the hardkey group 64 of the operation panel 60.

In the second embodiment, the reference result value is compared with a global result value, which is listed in a global result value field 1403 in FIG. 14, at each of the comparison timings. When the global result value is deviated to plus from the reference result value beyond the allowable estrangement rate 1404 (20%), the restrictive period starts.

In the second embodiment, when the result value is deviated to minus from the reference result value beyond the allowable estrangement rate 1404 (20%), the restriction is released. This is differs from the first embodiment.

Figure 15:
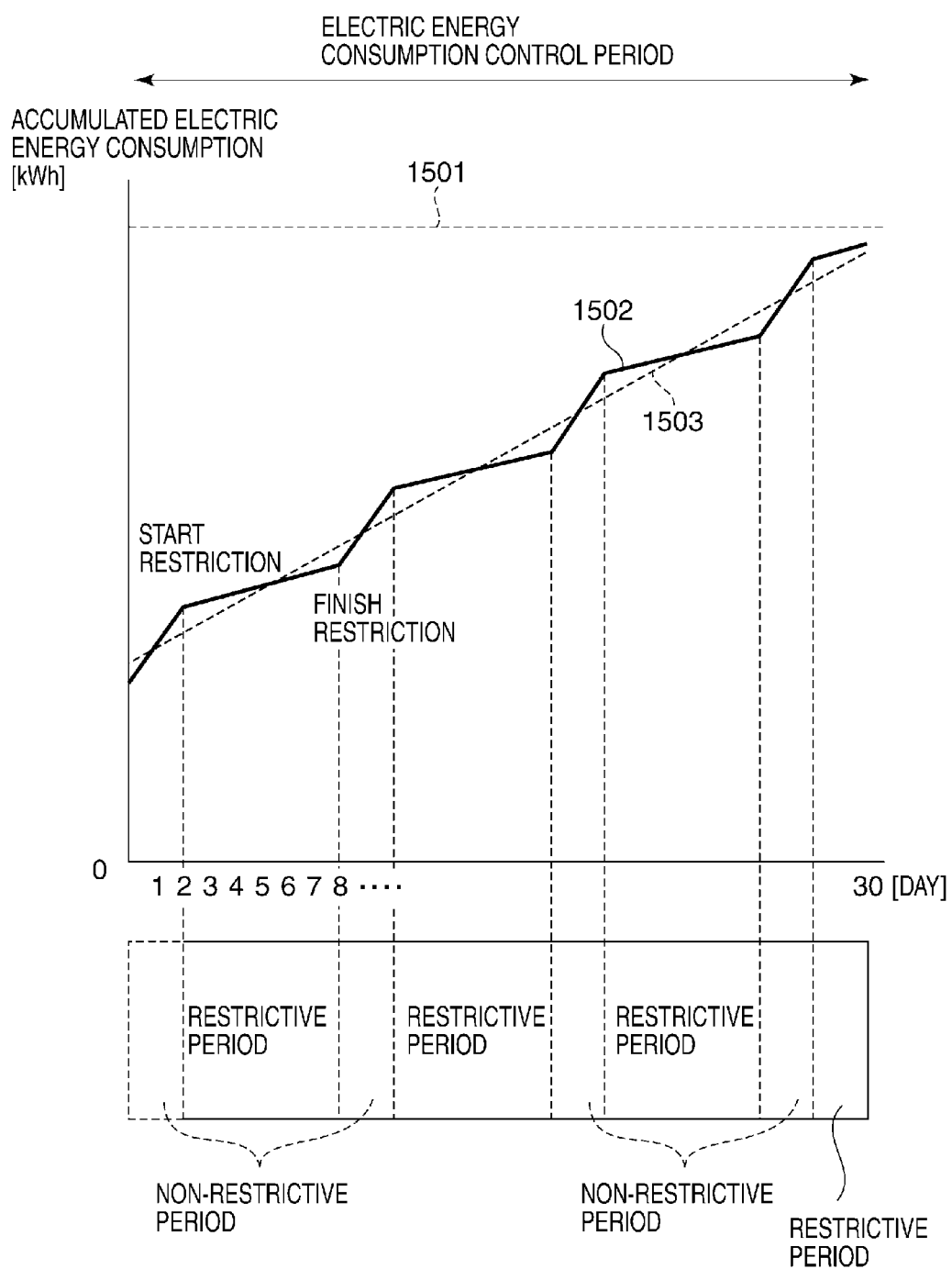
FIG. 15 is a graph showing a change of electric energy consumption of the entire electric energy consumption control system according to the second embodiment of the present invention.

Next, a change of the global result value of the entire system when it is controlled by the method of the second embodiment will be described with reference to FIG. 15. In FIG. 15, a broken line 1501 shows the target electric energy in the electric energy consumption control period, a broken line 1503 connects the reference result values at the respective comparison timings, and a solid line 1502 connects the result values of the entire system at the respective comparison timings. As shown in FIG. 15, the result value (the line 1502) of the entire system changes without being deviated from the reference result value (the line 1503) beyond the allowable estrangement rate 1404 (20%). A control of a job of each user in the restrictive period from a restriction start to a restriction release is the same as that in the first embodiment. Therefore, the second embodiment is able to control so that the electric energy consumption of the entire system does not increase beyond the predetermined target electric energy.

Since the configurations, operations, and effects of the second embodiment other than described are similar to that of the first embodiment mentioned above, detailed descriptions thereof are omitted.

Hereafter, an electric energy consumption control system according to a third embodiment of the present invention will be described with reference to the attached drawings. Since a configuration and a processing method in the third embodiment are almost the same as that in the first embodiment mentioned above, different points will be mainly described.

In the third embodiment, the individual result table 810 shown in FIG. 8 described in the first embodiment mentioned above is replaced by an individual result table 1600 shown in FIG. 16.

The individual result table 1600 shown in FIG. 16 is provided with a user name field 1601, a weight factor field 1602 in which a weight factor for each user is set beforehand through the hardkey group 64 of the operation panel 60, a electric energy consumption result value field 1603 for every user, and an adjusted result value field 1604 in which a product of the weight factor and the electric energy consumption result value for every user is set. A reference value field 1605 is the same as the reference value field 803 shown in FIG. 8 in the first embodiment.

In the third embodiment, the comparison between the reference value and the result value in the step S1103 in the job execution determination process in the first embodiment mentioned above is replaced with the comparison between the reference value and the adjusted result value. Then, in the third embodiment, a user whose adjusted result value is beyond the reference value is determined as a restricted user. It should be noted that the job of the restricted user is restricted in the same manner as the first embodiment. Accordingly, in the third embodiment, the priorities of users are adjustable by the weight factors. This enables to vary a substantial reference value for the restriction for the respective users.

Since the configurations, operations, and effects of the third embodiment other than described are similar to that of the first embodiment mentioned above, detailed descriptions thereof are omitted.

Hereafter, an electric energy consumption control system according to a fourth embodiment of the present invention will be described. Since a configuration and a processing method in the fourth embodiment are almost the same as that in the first embodiment mentioned above, different points will be mainly described.

In the fourth embodiment, the number of accumulated printing sheets is used as the electric energy consumption (pseudo electric energy consumption). This is a different point from the first embodiment in which the measured value in the image forming apparatus is used as the electric energy consumption.

In the fourth embodiment, the global result value in the global result table 710 shown in FIG. 7 is replaced with the number of accumulated printing sheets, and the numbers of printing sheets corresponding to the restriction starting value and the restriction release value are beforehand set through the hardkey group 64 of the operation panel 60. Furthermore, in the fourth embodiment, the accumulated electric energy consumption in the individual result table 810 shown in FIG. 8 is similarly added up as the number of accumulated printing sheets, and the reference value is changed to a value corresponding to the number of printing sheets.

The process in the fourth embodiment is different from the first embodiment as follows. That is, in the process in the fourth embodiment, the image forming apparatus 100 transmits the user name and the number of printing sheets of the job to the control apparatus 200 after processing the print job. In the step S903 in the individual result table process mentioned above, the control apparatus 200 adds the number of printing sheets to the accumulated electric energy consumption field 801 in the individual result table. In the process in the fourth embodiment, the total number of the printing sheets of all the users in the individual result table is recorded as the global result value at the comparison timing in the step S1003 in the global result table process mentioned above. It should be noted that the comparison of the global result value with the restriction starting value and the restriction release value in the global result table process, and the comparison of the reference value with the result value of each user in the individual result table process are similar to that of the first embodiment mentioned above.

Since the configurations, operations, and effects of the fourth embodiment other than described are similar to that of the first embodiment mentioned above, detailed descriptions thereof are omitted.

Other Embodiments

Aspects of the present invention can also be realized by a computer of a system or apparatus (or devices such as a CPU or MPU) that reads out and executes a program recorded on a memory device to perform the functions of the above described embodiment(s), and by a method, the steps of which are performed by a computer of a system or apparatus by, for example, reading out and executing a program recorded on a memory device to perform the functions of the above described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-243778, filed on Oct. 29, 2010, which is hereby incorporated by reference herein in its entirety.

What is claimed is:

1. An electric energy consumption control system comprising:
    an electrical apparatus that is connected to a network comprising:
        an electric energy consumption specifying unit configured to specify electric energy consumption for every job;
        a user identifying unit configured to identify a name of a user who performs a job; and
        a transmission unit configured to transmit data in which the electric energy consumption of the job specified by said electric energy consumption specifying unit is associated with the user name through the network;
    an electric energy consumption control apparatus that is connected to the network comprising:
        a restriction value control unit configured to set and hold a restriction starting value that starts restriction to electric energy consumption of an entire system and a restriction release value that releases the restriction to the electric energy consumption of the entire system;
        a first comparison unit configured to compare the electric energy consumption of the entire system with the restriction starting value and the restriction release value at every predetermined comparison timing;
        a restrictive period setting unit configured to start a restrictive period when said first comparison unit determines that the electric energy consumption of the entire system is beyond the restriction starting value, and to finish the restrictive period when said first comparison unit determines that the electric energy consumption of the entire system is below the restriction release value;
        a second comparison unit configured to compare accumulated electric energy consumption of the user who designated the job with a predetermined reference value of individual result when receiving job execution permission by the user in the restrictive period;
        a job restriction unit configured to restrict the job of the user concerned when said second comparison unit determines that the accumulated electric energy consumption of the user is beyond the reference value; and
        a job permission unit configured to permit the job of the user concerned when said second comparison unit determines that the accumulated electric energy consumption of the user is not beyond the reference value, and to permit the job of any users when receiving a job execution permission in a period other than the restrictive period.

2. The electric energy consumption control system according to claim 1, wherein the restriction starting value and the restriction release value are set beforehand.

3. The electric energy consumption control system according to claim 1, wherein the restriction starting value and the restriction release value are calculated from predetermined target electric energy.

4. The electric energy consumption control system according to claim 1, wherein said second comparison unit compares an adjusted result value that is a product of the accumulated electric energy consumption of the user who designated the job and a weight factor set beforehand for the user with the reference value.

5. The electric energy consumption control system according to claim 1, wherein said electric energy consumption specifying unit adds up a number of accumulated printing sheets for every user,
    wherein said second comparison unit compares the number of accumulated printing sheets of the user who designated the job with a reference number corresponding to a predetermined number of accumulated printing sheets when receiving job execution permission by the user in the restrictive period, and
    wherein said job restriction unit restricts the job of the user concerned when said second comparison unit determines that the number of accumulated printing sheets is beyond the reference number.

6. The electric energy consumption control system according to claim 1, wherein said user identifying unit identifies the user name from data of the job received via the network.

7. The electric energy consumption control system according to claim 1, wherein said user identifying unit identifies the user name authenticated by a user authentication resource that requires specification of the user name.

8. A electric energy consumption control method that can be used in an electric energy consumption control system that includes connecting electrical apparatuses with an electric energy consumption control apparatus via a network so that communication is possible, the method comprising:
    a step of specifying electric energy consumption for every job, which is executed by an electrical apparatus;
    a step of identifying a name of a user who performs a job, which is executed by the electrical apparatus;

a step of transmitting data in which the electric energy consumption of the job specified by an electric energy consumption specifying unit is associated with the user name through the network, which is executed by the electrical apparatus;

a step of setting and holding a restriction starting value that starts restriction to electric energy consumption of an entire system and a restriction release value that releases the restriction to the electric energy consumption of the entire system, which is executed by the electric energy consumption control apparatus;

a step of comparing the electric energy consumption of the entire system with the restriction starting value and the restriction release value at every predetermined comparison timing, which is executed by the electric energy consumption control apparatus;

a step of starting a restrictive period when it is determined that the electric energy consumption of the entire system is beyond the restriction starting value, which is executed by the electric energy consumption control apparatus;

a step of finishing the restrictive period when it is determined that the electric energy consumption of the entire system is below the restriction release value, which is executed by the electric energy consumption control apparatus;

a step of comparing accumulated electric energy consumption of the user who designated the job with a predetermined reference value of individual result when receiving job execution permission by the user in the restrictive period, which is executed by the electric energy consumption control apparatus;

a step of restricting the job when it is determined that the accumulated electric energy consumption of the user is beyond the reference value; and a step of permitting the job of the user concerned when it is determined that the accumulated electric energy consumption of the user is not beyond the reference value, and of permitting the job of any users when receiving the job execution permission in a period other than the restrictive period.

9. A non-transitory computer-readable storage medium storing a control program causing a computer to execute an electric energy consumption control method that can be used in an electric energy consumption control system that includes connecting electrical apparatuses with an electric energy consumption control apparatus via a network so that communication is possible, the method comprising:

a step of specifying electric energy consumption for every job, which is executed by an electrical apparatus;

a step of identifying a name of a user who performs a job, which is executed by the electrical apparatus;

a step of transmitting data in which the electric energy consumption of the job specified by an electric energy consumption specifying unit is associated with the user name through the network, which is executed by the electrical apparatus;

a step of setting and holding a restriction starting value that starts restriction to electric energy consumption of an entire system and a restriction release value that releases the restriction to the electric energy consumption of the entire system, which is executed by the electric energy consumption control apparatus;

a step of comparing the electric energy consumption of the entire system with the restriction starting value and the restriction release value at every predetermined comparison timing, which is executed by the electric energy consumption control apparatus;

a step of starting a restrictive period when it is determined that the electric energy consumption of the entire system is beyond the restriction starting value, which is executed by the electric energy consumption control apparatus;

a step of finishing the restrictive period when it is determined that the electric energy consumption of the entire system is below the restriction release value, which is executed by the electric energy consumption control apparatus;

a step of comparing accumulated electric energy consumption of the user who designated the job with a predetermined reference value of individual result when receiving job execution permission by the user in the restrictive period, which is executed by the electric energy consumption control apparatus;

a step of restricting the job when it is determined that the accumulated electric energy consumption of the user is beyond the reference value; and a step of permitting the job of the user concerned when it is determined that the accumulated electric energy consumption of the user is not beyond the reference value, and of permitting the job of any users when receiving the job execution permission in a period other than the restrictive period.

* * * * *